United States Patent
Williams

(10) Patent No.: US 7,213,870 B1
(45) Date of Patent: May 8, 2007

(54) ADJUSTABLE SPOILER

(76) Inventor: Joseph L. Williams, 16306 Wakely Cir., Omaha, NE (US) 68118

(*) Notice: Subject to any disclaimer, the term of this patent is extended or adjusted under 35 U.S.C. 154(b) by 0 days.

(21) Appl. No.: 11/292,201

(22) Filed: Dec. 1, 2005

(51) Int. Cl.
*B62D 37/02* (2006.01)

(52) U.S. Cl. ............................ 296/180.5; 296/180.3

(58) Field of Classification Search ............ 296/180.1, 296/180.2, 180.3, 180.5; 180/903
See application file for complete search history.

(56) References Cited

U.S. PATENT DOCUMENTS

| | | | |
|---|---|---|---|
| 4,174,863 A * | 11/1979 | Gotz | 296/180.5 |
| 4,773,692 A | 9/1988 | Schleicher et al. | |
| 5,141,281 A | 8/1992 | Eger et al. | |
| 5,429,411 A * | 7/1995 | Spears | 296/180.1 |
| 6,170,904 B1 | 1/2001 | Schaedlich et al. | |
| 6,382,708 B1 | 5/2002 | Erdelitsch et al. | |
| 6,540,282 B2 | 4/2003 | Pettey | |
| 6,814,395 B1 | 11/2004 | Lin | |
| 2004/0075298 A1 * | 4/2004 | Wong et al. | 296/180.2 |
| 2005/0077753 A1 * | 4/2005 | Burg | 296/180.5 |

FOREIGN PATENT DOCUMENTS

JP 2117476 * 2/1990

* cited by examiner

*Primary Examiner*—Joseph D. Pape
(74) *Attorney, Agent, or Firm*—Dale J. Ream

(57) ABSTRACT

An adjustable spoiler includes a front portion and a rear portion having leading and trailing edges, respectively, in parallel alignment. An extension actuator is operably connected to the front and rear portions for selectively extending or retracting a distance between said portions. A stretchable fabric covers the front and rear portions and extends therebetween. The adjustable spoiler includes a processor and a user interface for energizing the extension actuator to adjust the front and rear portion configuration. A moisture sensor may be connected to the processor for adjusting the spoiler upon sensing moisture on a roadway. A brake sensor may also be connected to the processor for actuating adjustment upon activation of a vehicle brake. The adjustable spoiler may include a tilt sensor for adjusting the vertical configuration of a leading or trailing edge of the front or rear portion.

15 Claims, 6 Drawing Sheets

ADJUSTABLE SPOILER

BACKGROUND OF THE INVENTION

This invention relates to automobile spoilers and, more particularly, to an automobile spoiler that allows a driver to adjust spoiler configurations to optimize characteristics based on environmental driving conditions. The spoiler may be preset for automatic adjustments based on road conditions or allow a driver to manually adjust spoiler positions.

Various devices and systems have been proposed in the art for adjusting the aerodynamics of a vehicle spoiler so as to optimize its performance in various road conditions. Although assumably effective for their intended purposes, the existing devices and systems do not selectively provide for both automatic spoiler adjustments based on current road conditions or manual adjustments by the driver. Further, the existing devices do not provide both extension and tilt actuation of a spoiler.

Therefore, it would be desirable to have an automobile spoiler that may be manually adjusted by a driver through an electronic user interface. Further, it would be desirable to have a spoiler that may be adjusted automatically based on current road conditions or activation of the vehicle brake. Still further, it would be desirable to have an adjustable spoiler having both extension and tilt adjustment actuators.

SUMMARY OF THE INVENTION

An adjustable spoiler according to the present invention includes elongate front and rear portions having leading and trailing edges, respectively. The leading and trailing edges are in parallel alignment. An extension actuator is operatively coupled to the front and rear portions for selectively extending or retracting a relative distance therebetween. The rear portion may be completely retracted into the front portion. A stretchable fabric covers the front and rear portions of the adjustable spoiler to create a continuous outer geometry. The adjustable spoiler further includes a processor in communication with one or more sensors for automatically actuating the extension actuator upon sensing certain predetermined conditions, such as moisture or pressure on the vehicle brake pedal. Further, the adjustable spoiler may include a user interface for enabling a user to selectively energize the extension actuator.

The adjustable spoiler may also include a tilt actuator operably connected to either the front portion or rear portion for relative movement thereof. The tilt actuator selectively causes the trailing edge to be lower at one configuration than at another configuration. The tilt actuator is also electrically connected to the processor for operation according to the sensors or user interface.

Therefore, a general object of this invention is to provide an adjustable spoiler for an automobile that enables a driver to select appropriate or desired performance characteristics of the spoiler.

Another object of this invention is to provide an adjustable spoiler, as aforesaid, that adjusts spoiler configurations based on current driving conditions.

Still another object of this invention is to provide an adjustable spoiler, as aforesaid, that can be adjusted automatically by interaction of a processor and sensors or manually through a user interface.

Yet another object of this invention is to provide an adjustable spoiler, as aforesaid, which includes a moisture sensor for sensing moisture content upon a roadway.

A further object of this invention is to provide an adjustable spoiler, as aforesaid, having a brake sensor for sensing when a vehicle brake has been activated.

A still further object of this invention is to provide an adjustable spoiler, as aforesaid, that is easy to use, inexpensive to manufacture, and easy to install.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

An adjustable spoiler according to the present invention will now be described in detail with reference to FIGS. 1 through 6b of the accompanying drawings. More particularly, an adjustable spoiler 100 according to the current invention includes an elongate front portion 110 and an elongate rear portion 120.

Figure 1:
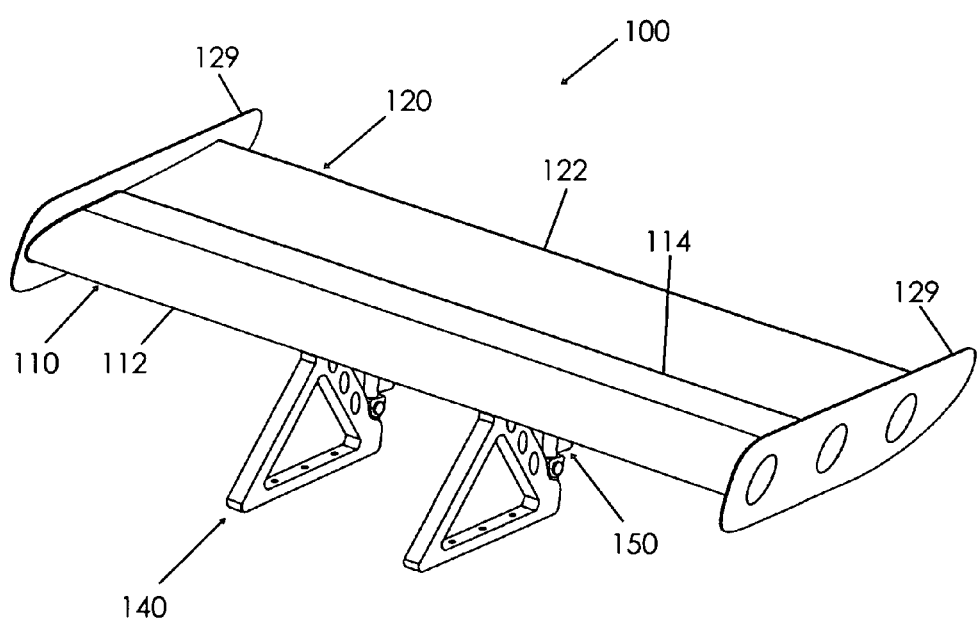
FIG. 1 is a perspective view of an adjustable spoiler according to the present invention.

The front portion 110 has a leading edge 112, the rear portion 120 has a trailing edge 122, and the front and rear portions 110, 120 collectively define upper and lower surfaces 115, 125. The upper surface 115 has a first surface area, and the lower surface 125 has a second surface area. The leading edge 112 and the trailing edge 122 preferably remain generally parallel at all times, and the rear portion 120 may be selectively retractable inside the first portion 110 (FIGS. 3b–3c). The back edge 114 of the front portion 110 may be beveled to minimize the disruption of airflow across the front and rear portion 110, 120, as shown in FIGS. 2b–2c and 3b–3c. In one embodiment, a stretchable fabric may cover the front and rear portions 110, 120 to create a continuous outer geometry. Endpieces 129 may be included for structural or aesthetic purposes as shown in FIG. 1.

As shown in FIGS. 2b, 2c, and 3b-4, an extension actuator 130 may be operably coupled to the front and rear portions 110, 120 for selective relative movement between the rear portion 120 and the front portion 110. Though the rear portion 120 is shown as moving relative to the front portion 110 throughout the drawings, the front portion 110 may be moved relative to the rear portion 120; which portion moves is immaterial as long as relative movement occurs.

The extension actuator 130 is movable between a first configuration 130a (FIG. 3b) and a second configuration 130b (FIG. 3c) and may be positioned intermittently therebetween. When the extension actuator 130 is at the first configuration 130a, the leading edge 112 is relatively close to the trailing edge 122; when the extension actuator 130 is at the second configuration 130b, the leading edge 112 is relatively distant to the trailing edge 122. By moving the extension actuator 130 between the first and second configurations 130a, 130b, the surface areas of the upper and lower surfaces 115, 125 are increased or decreased accordingly.

Figure 2A:
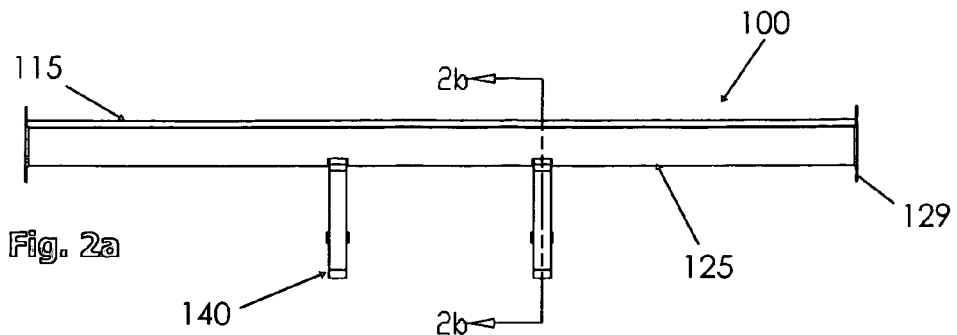
FIG. 2a is a front view of the adjustable spoiler as in FIG. 1.
Figure 2B:
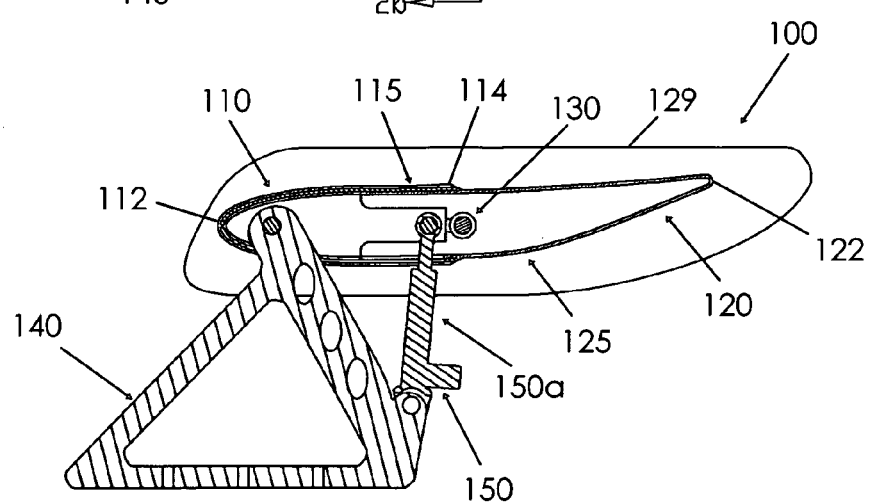
FIG. 2b is a sectional view taken along line 2b–2b of FIG. 2a showing a tilt actuator in a retracted configuration.
Figure 2C:
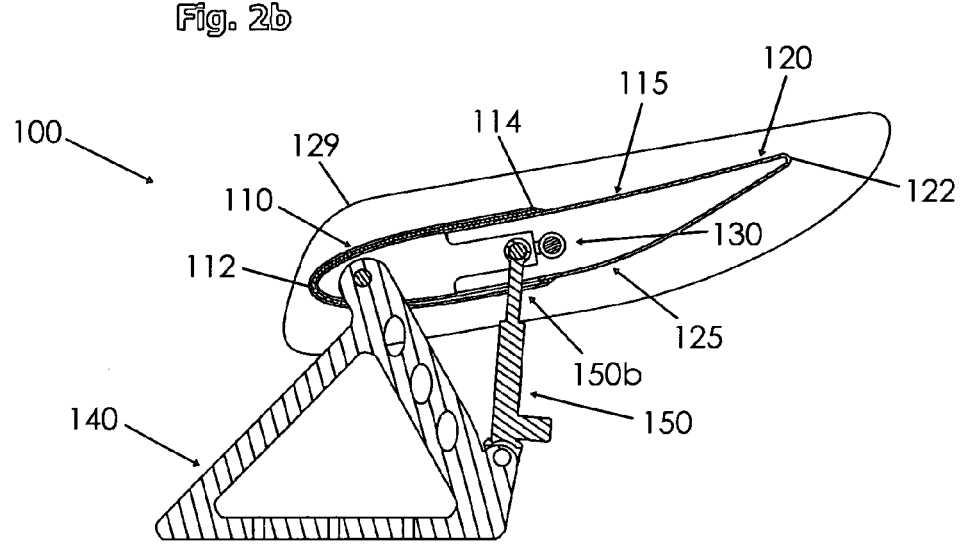
FIG. 2c is a sectional view taken along line 2b–2b of FIG. 2a showing the tilt actuator in an extended configuration.
Figure 3A:
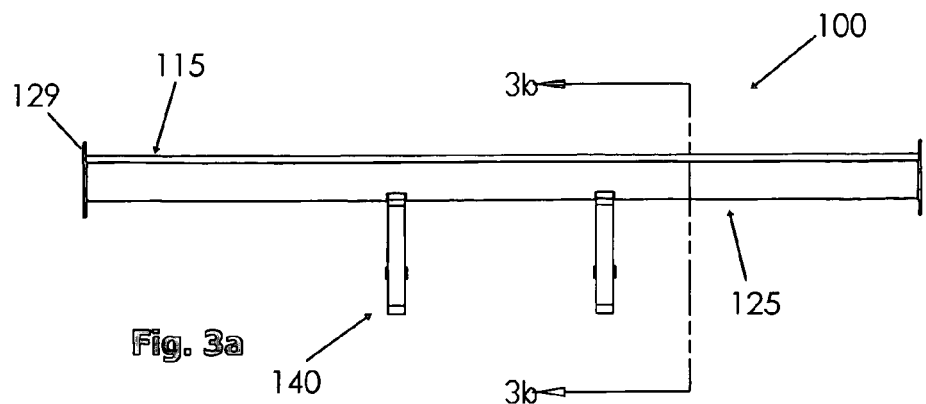
FIG. 3a is another front view of the adjustable spoiler as in FIG. 1.
Figure 3B:
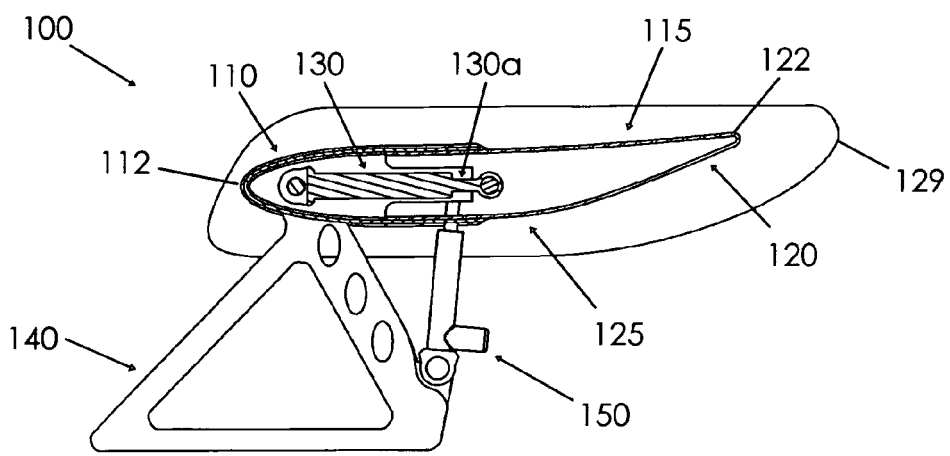
FIG. 3b is a sectional view taken along line 3b–3b of FIG. 3a showing an extension actuator in a retracted configuration.
Figure 3C:
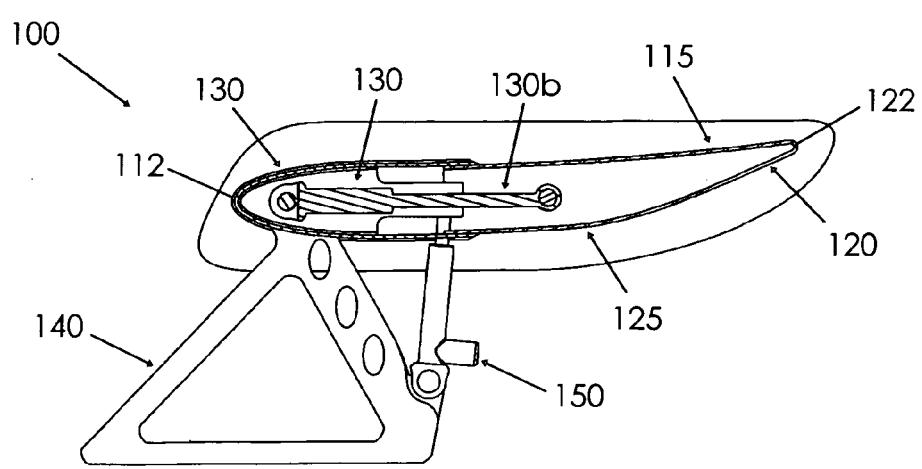
FIG. 3c is a sectional view taken along line 3b–3b of FIG. 3a showing the extension actuator in an extended configuration.
Figure 4:
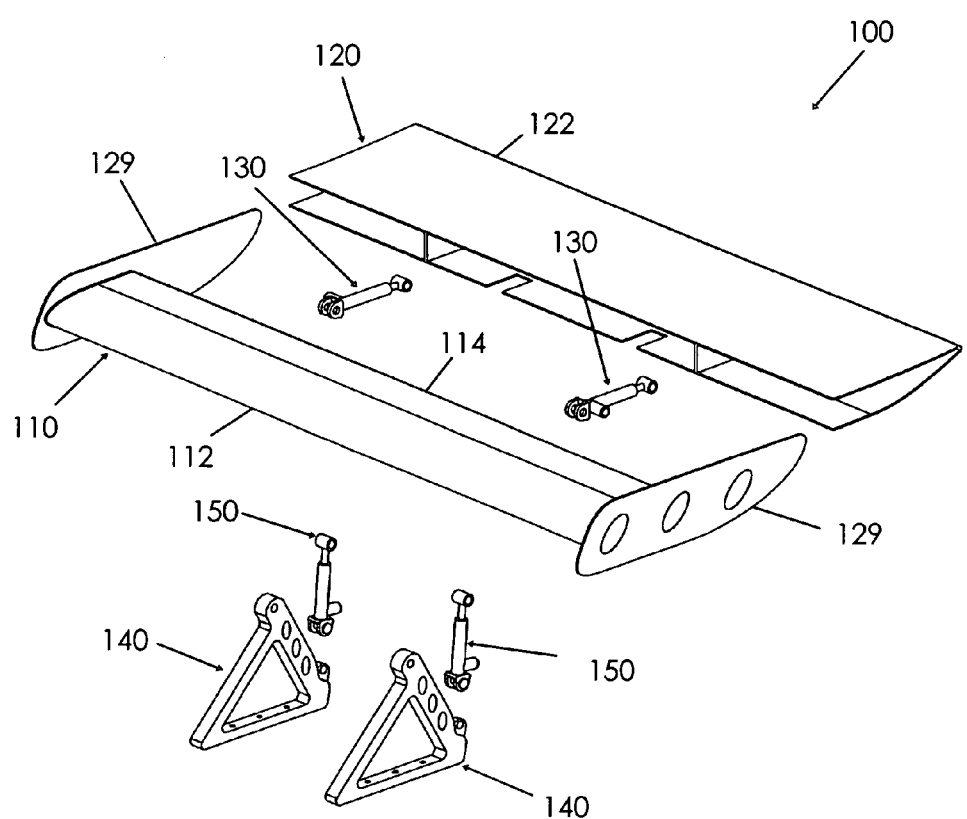
FIG. 4 is an exploded view of the adjustable spoiler as in FIG. 1.

As best shown in FIGS. 2b and 2c, a bracket 140 may be pivotably connected to the front portion 110. A tilt actuator 150 is preferably connected to the bracket 140 and operably connected to either the front portion 110 or the rear portion 120 to selectively move the front and rear portions 110, 120 angularly relative to the bracket 140. The tilt actuator 150 is movable between a first tilt configuration 150a (FIG. 2b) and a second tilt configuration 150b (FIG. 2c) and may be positioned intermittently therebetween. The trailing edge 122 is relatively lower when the tilt actuator 150 is at the first tilt configuration 150a than when the tilt actuator 150 is at the second tilt configuration 150b, as seen by comparing FIG. 2b to FIG. 2c.

Figure 5:
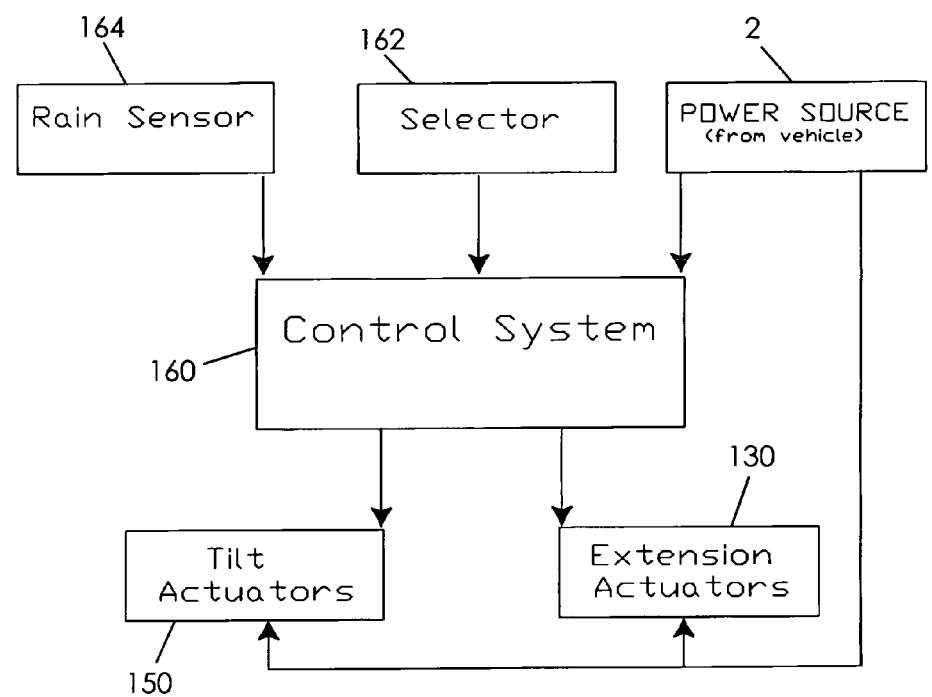
FIG. 5 is a block diagram of the adjustable spoiler as in FIG. 1.

While the spoiler 100 may be installed on an automobile, and both the extension actuator 130 and the tilt actuator 150 may be electric actuators electrically connected to the automobile's battery 2 (FIG. 5), other actuators may be used (i.e., pneumatic or hydraulic). A moisture sensor 164 and a brake sensor 166 may be included to detect moisture and the application of the automobile's brake, respectively. A processor 160 may be in communication with a user interface 162, the moisture sensor 164, and the brake sensor 166 (FIG. 5). The processor 160 is preferably also in communication with the extension actuator 130 and the tilt actuator 150 for selectively moving the extension actuator 130 between the first and second configurations 130a, 130 and selectively moving the tilt actuator 150 between the first and second tilt configurations 150a, 150b.

The processor 160 preferably includes (a) programming for automatically adjusting the extension actuator 130 and/or the tilt actuator 150 when the moisture sensor 164 detects moisture and (b) programming for automatically adjusting the extension actuator 130 and/or the tilt actuator 150 when the brake sensor 166 detects activation of the automobile's brake. Further, the user interface 162 or the processor 160 may selectively store settings for the extension and tilt actuators 130, 150 so a user may conveniently restore those settings.

In use, the bracket 140 may be attached to an automobile, and the processor 160, the extension actuator 130, and the tilt actuator 150 may be connected to the automobile's battery 2 (FIG. 5). The moisture sensor 164 may be positioned on the automobile, the brake sensor 166 may be placed in communication with the automobile's brake, and the user interface 162 may be installed inside the automobile to be accessible to a driver. The driver may alter the extension actuator 130 and/or the tilt actuator 150 via the user interface 162, or the driver may use the user interface 162 to choose to have the extension actuator 130 and/or the tilt actuator 150 automatically controlled by the processor 160 using data from the moisture sensor 164 and/or the brake sensor 166.

Figure 6A:
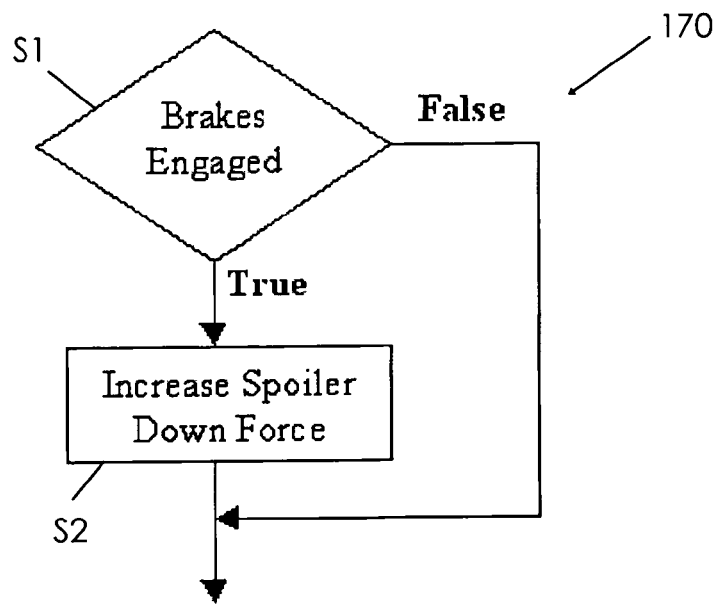
FIGS. 6a and 6b are flowcharts showing the logic performed by the processor as in FIG. 5.
Figure 6B:
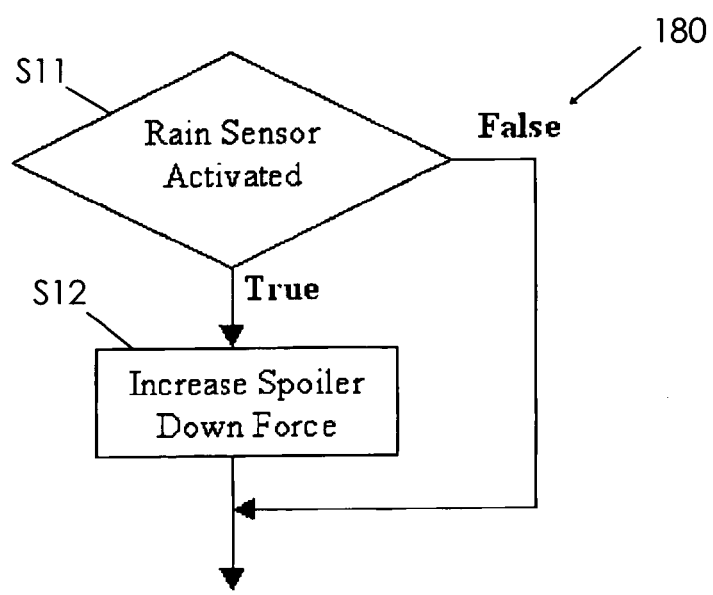

A process 170 showing an example of logic followed by the processor 160 is depicted in FIG. 6a. At step S1, the brake sensor 166 determines whether the automobile's brakes are applied. If so, the process continues to step S2; if not, the process 170 bypasses step S2. At step S2, the processor 160 adjusts the extension actuator 130 and/or the tilt actuator 150.

Another process 180 showing an example of logic followed by the processor 160 is depicted in FIG. 6. At step S111, the moisture sensor 164 determines whether a predetermined amount of moisture is present. If so, the process continues to step S12; if not, the process 180 bypasses step S12. At step S12, the processor 160 adjusts the extension actuator 130 and/or the tilt actuator 150.

Adjusting the extension actuator 130 affects the amount of down force being applied by the front and rear portions 110, 120 because the surface areas of the upper and lower surfaces 115, 125 are altered as described above. This is easily understood by considering the lift equation (with SA=surface area of the lower surface 125):

$$\text{Lift} = \text{coefficient} \times SA \times \frac{density_{air} \times velocity^2}{2}$$

Adjusting the lift actuator 150 affects the amount of down force being applied by the front and rear portions 110, 120 because the angle of attack ("attackangle") is being altered. As the coefficient in the above equation is equal to $2 \times \pi \times$ attackangle, the angle of attack directly affects the amount of lift.

In one embodiment, the user interface 162 includes a display and at least one load cell is included. The at least one load cell is in communication with the processor 160 and attached to the front portion 110 and/or the rear portion 120 for gathering force information. The processor 160 may include programming for outputting data from the load cell to the display, indicating an amount of down force being applied by the front and rear portions 110, 120 and detected by the load cell.

It is understood that while certain forms of this invention have been illustrated and described, it is not limited thereto except insofar as such limitations are included in the following claims and allowable functional equivalents thereof.

What is claimed is:

1. An adjustable spoiler, comprising:
   an elongate front portion having a leading edge;
   an elongate rear portion having a trailing edge;
   an extension actuator operably coupled to said front portion and said rear portion for selective relative movement between said rear portion and said front portion, said leading edge and said trailing edge remaining generally parallel at all times and
   a stretchable fabric covering said front and rear portions to create a continuous outer geometry.

2. The adjustable spoiler as in claim 1, wherein said extension actuator is movable between a first configuration in which said leading edge is relatively close to said trailing edge and a second configuration in which said leading edge is relatively distant to said trailing edge.

3. The adjustable spoiler as in claim 2, further comprising a processor in communication with a user interface and said extension actuator for selectively moving said extension actuator between said first and second configurations.

4. The adjustable spoiler as in claim 3, further comprising a moisture sensor in communication with said processor, said processor having programming for automatically adjusting said extension actuator upon said moisture sensor detecting moisture.

5. The adjustable spoiler as in claim 3 for use with an automobile having a brake, said spoiler further comprising a brake sensor in communication with said processor, said processor having programming for automatically adjusting said extension actuator upon said brake sensor detecting activation of said brake.

6. The adjustable spoiler as in claim 3, wherein:
said user interface includes a display;
at least one load cell is in communication with said processor and attached to at least one of said front portion and said rear portion;
said processor includes programming for outputting data to said display indicating an amount of down force being applied by said front and rear portions and detected by said load cell.

7. The adjustable spoiler as in claim 2, wherein:
a bracket is pivotably connected to said front portion;
a tilt actuator is connected to said bracket and operably connected to one of said front portion and said rear portion for movement of said front and rear portions relative to said bracket; and
said tilt actuator is movable between first and second tilt configurations, said trailing edge being relatively lower when said tilt actuator is at said first tilt configuration than when said tilt actuator is at said second tilt configuration.

8. The adjustable spoiler as in claim 7, further comprising a processor in communication with a user interface, said extension actuator, and said tilt actuator for selectively moving said extension actuator between said first and second configurations and selectively moving said tilt actuator between said first and second tilt configurations.

9. The adjustable spoiler as in claim 8, further comprising a moisture sensor in communication with said processor, said processor having programming for automatically adjusting at least one of said extension actuator and said tilt actuator upon said moisture sensor detecting moisture.

10. The adjustable spoiler as in claim 9 for use with an automobile having a brake, said spoiler further comprising a brake sensor in communication with said processor, said processor having programming for automatically adjusting at last one of said extension actuator and said tilt actuator upon said brake sensor detecting activation of the brake.

11. The adjustable spoiler as in claim 1, further comprising:
a bracket pivotably connected to said front portion; and
a tilt actuator connected to said bracket and operably connected to one of said front portion and said rear portion for movement of said front and rear portions relative to said bracket.

12. The adjustable spoiler as in claim 11, wherein said tilt actuator is movable between first and second configurations, said trailing edge being relatively lower when said tilt actuator is at said first configuration than when said tilt actuator is at said second configuration.

13. The adjustable spoiler as in claim 11 for use with an automobile having a battery, wherein:
said extension actuator is an electric actuator electrically connected to the battery; and
said tilt actuator is another electric actuator electrically connected to the battery.

14. The adjustable spoiler as in claim 1, wherein said rear portion is selectively retractable inside said front portion.

15. The adjustable spoiler as in claim 14, wherein a back edge of said front portion is beveled to minimize disruption of airflow across said front and rear portions.

* * * * *